US010147139B2

(12) United States Patent
Salvadori et al.

(10) Patent No.: US 10,147,139 B2
(45) Date of Patent: *Dec. 4, 2018

(54) ORDER RISK MANAGEMENT FOR DERIVATIVE PRODUCTS

(71) Applicant: Chicago Mercantile Exchange Inc., Chicago, IL (US)

(72) Inventors: David Salvadori, Bartlett, IL (US); John Falck, Chicago, IL (US); Charlie Troxel, Naperville, IL (US); James Farrell, Carol Stream, IL (US); Agnes Shanthi Thiruthuvadoss, Chicago, IL (US); Arjuna Ariathurai, Chicago, IL (US); Scott Johnston, Oak Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,685

(22) Filed: Mar. 27, 2017

(65) Prior Publication Data

US 2017/0200231 A1 Jul. 13, 2017

Related U.S. Application Data

(60) Continuation of application No. 14/153,801, filed on Jan. 13, 2014, now Pat. No. 9,607,338, which is a
(Continued)

(51) Int. Cl.
*G06Q 40/00* (2012.01)
*G06Q 40/04* (2012.01)
(Continued)

(52) U.S. Cl.
CPC ......... *G06Q 40/04* (2013.01); *G06Q 30/0283* (2013.01); *G06Q 30/0601* (2013.01); *G06Q 40/00* (2013.01); *G06Q 40/06* (2013.01)

(58) Field of Classification Search
CPC ............................. G06Q 40/00; G06Q 40/06
See application file for complete search history.

(56) References Cited

U.S. PATENT DOCUMENTS 5,649,116 A    7/1997    McCoy et al.
5,799,287 A    8/1998    Dembo
(Continued)

FOREIGN PATENT DOCUMENTS

CA    2406418 A1    10/2001
CA    2430173 A1    6/2002
(Continued)

OTHER PUBLICATIONS

Aug. 8, 2017—(US)—Final Office Action—U.S. Appl. No. 12/496,831.
(Continued)

*Primary Examiner* — Lalita M Hamilton
(74) *Attorney, Agent, or Firm* — Banner & Witcoff, Ltd.

(57) ABSTRACT

Systems and methods are provided for processing derivative product orders at an exchange. Traders provide derivative product order risk data to the exchange. The order risk data may include maximum delta, gamma and/or vega utilization values for derivative product contracts based on the same underlying product. Before executing a trade, a match system analyzes the trader's current utilization state and the utilization that would result after the trade. The match system may then execute all or a portion of the trade.

14 Claims, 7 Drawing Sheets

Related U.S. Application Data continuation of application No. 13/660,486, filed on Oct. 25, 2012, now Pat. No. 8,688,567, which is a continuation of application No. 13/182,178, filed on Jul. 13, 2011, now Pat. No. 8,326,738, which is a continuation of application No. 11/951,891, filed on Dec. 6, 2007, now Pat. No. 7,991,684, which is a division of application No. 10/676,318, filed on Oct. 1, 2003, now Pat. No. 7,440,917, which is a continuation-in-part of application No. 10/611,458, filed on Jul. 1, 2003, now Pat. No. 7,571,133, which is a continuation-in-part of application No. 10/385,152, filed on Mar. 10, 2003, now Pat. No. 7,152,041.

(51) Int. Cl.
  *G06Q 30/02* (2012.01)
  *G06Q 30/06* (2012.01)
  *G06Q 40/06* (2012.01)

(56) References Cited

U.S. PATENT DOCUMENTS

| | | | |
|---|---|---|---|
| 5,924,082 | A | 7/1999 | Silverman et al. |
| 5,950,176 | A | 9/1999 | Keiser et al. |
| 6,014,643 | A | 1/2000 | Minton |
| 6,016,483 | A | 1/2000 | Rickard et al. |
| 6,018,722 | A | 1/2000 | Ray et al. |
| 6,061,662 | A | 5/2000 | Makivic |
| 6,112,189 | A | 8/2000 | Rickard et al. |
| 6,195,647 | B1 | 2/2001 | Martyn et al. |
| 6,236,972 | B1 | 5/2001 | Shkedy |
| 6,263,321 | B1 | 7/2001 | Daughtery, III |
| 6,282,521 | B1 | 8/2001 | Howorka |
| 6,317,727 | B1 | 11/2001 | May |
| 6,321,212 | B1 | 11/2001 | Lange |
| 6,347,307 | B1 | 2/2002 | Sandhu et al. |
| 6,360,210 | B1 | 3/2002 | Wallman |
| 6,418,419 | B1 | 7/2002 | Nieboer et al. |
| 6,421,653 | B1 | 7/2002 | May |
| 6,505,174 | B1 | 1/2003 | Keiser et al. |
| 6,616,725 | B2 | 9/2003 | Cho et al. |
| 6,618,707 | B1 | 9/2003 | Gary |
| 6,622,129 | B1 | 9/2003 | Whitworth |
| 6,850,907 | B2 | 2/2005 | Lutnick et al. |
| 7,024,387 | B1 | 4/2006 | Nieboer et al. |
| 7,089,204 | B1 | 8/2006 | Nieboer et al. |
| 7,117,833 | B2 | 10/2006 | Spath et al. |
| 7,152,041 | B2 | 12/2006 | Salavadori et al. |
| 7,177,833 | B1 | 2/2007 | Marynowski et al. |
| 7,321,872 | B1 | 1/2008 | Kaminsky et al. |
| 7,418,422 | B2 | 8/2008 | Burns |
| 7,440,917 | B2 | 10/2008 | Farrell et al. |
| 7,567,499 | B2 | 7/2009 | Nakamura et al. |
| 7,567,932 | B1 | 7/2009 | Salvadori et al. |
| 7,571,133 | B2 | 8/2009 | Farrell et al. |
| 7,672,899 | B2 | 3/2010 | Farrell et al. |
| 7,778,911 | B2 | 8/2010 | Salvadori et al. |
| 7,890,418 | B2 | 2/2011 | Farrell et al. |
| 7,991,684 | B2 | 8/2011 | Salvadori et al. |
| 8,060,431 | B2 | 11/2011 | Farrell et al. |
| 8,160,949 | B2 | 4/2012 | Johnston et al. |
| 8,224,737 | B2 | 7/2012 | Farrell et al. |
| 8,326,738 | B2 | 12/2012 | Johnston et al. |
| 8,688,567 | B2 | 4/2014 | Salvadori et al. |
| 2001/0032163 | A1 | 10/2001 | Fertik et al. |
| 2001/0034695 | A1 | 10/2001 | Wilkinson |
| 2001/0042036 | A1 | 11/2001 | Sanders |
| 2001/0044771 | A1 | 11/2001 | Usher et al. |
| 2001/0056398 | A1 | 12/2001 | Scheirer |
| 2002/0002530 | A1 | 1/2002 | May |
| 2002/0016760 | A1 | 2/2002 | Pathak |
| 2002/0046151 | A1 | 4/2002 | Otero et al. |
| 2002/0049661 | A1 | 4/2002 | Otero et al. |
| 2002/0065755 | A1 | 5/2002 | Shlafman et al. |
| 2002/0069155 | A1 | 6/2002 | Nafeh et al. |
| 2002/0073007 | A1 | 6/2002 | Ayache |
| 2002/0082967 | A1 | 6/2002 | Kaminsky et al. |
| 2002/0099651 | A1 | 7/2002 | May |
| 2002/0116317 | A1 | 8/2002 | May |
| 2002/0120542 | A1 | 8/2002 | Higgins |
| 2002/0128955 | A1 | 9/2002 | Brady et al. |
| 2002/0133456 | A1 | 9/2002 | Lancaster et al. |
| 2002/0138390 | A1 | 9/2002 | May |
| 2002/0156719 | A1 | 10/2002 | Finebaum et al. |
| 2002/0169703 | A1 | 11/2002 | Lutnick et al. |
| 2002/0174055 | A1 | 11/2002 | Dick et al. |
| 2002/0174056 | A1 | 11/2002 | Sefein et al. |
| 2002/0194115 | A1 | 12/2002 | Nordlicht et al. |
| 2003/0004853 | A1 | 1/2003 | Ram et al. |
| 2003/0009419 | A1 | 1/2003 | Chavez et al. |
| 2003/0023536 | A1 | 1/2003 | Hollerman et al. |
| 2003/0023546 | A1 | 1/2003 | Shepherd |
| 2003/0028468 | A1 | 2/2003 | Wong et al. |
| 2003/0028476 | A1 | 2/2003 | Jenkins et al. |
| 2003/0033212 | A1 | 2/2003 | Sandhu et al. |
| 2003/0033240 | A1 | 2/2003 | Balson et al. |
| 2003/0041009 | A1 | 2/2003 | Grey et al. |
| 2003/0046218 | A1 | 3/2003 | Albanese et al. |
| 2003/0061148 | A1 | 3/2003 | Alavian |
| 2003/0069821 | A1 | 4/2003 | Williams |
| 2003/0069836 | A1 | 4/2003 | Penney et al. |
| 2003/0074167 | A1 | 4/2003 | Browne et al. |
| 2003/0083978 | A1 | 5/2003 | Brouwer |
| 2003/0093347 | A1 | 5/2003 | Gray |
| 2003/0093360 | A1 | 5/2003 | May |
| 2003/0097328 | A1 | 5/2003 | Lundberg et al. |
| 2003/0101123 | A1 | 5/2003 | Alvarado et al. |
| 2003/0101125 | A1 | 5/2003 | McGill et al. |
| 2003/0115128 | A1 | 6/2003 | Lange et al. |
| 2003/0195822 | A1 | 10/2003 | Tatge et al. |
| 2003/0208430 | A1 | 11/2003 | Gershon |
| 2003/0216932 | A1 | 11/2003 | Foley |
| 2003/0220865 | A1 | 11/2003 | Lutnick |
| 2003/0220868 | A1 | 11/2003 | May |
| 2003/0225648 | A1 | 12/2003 | Hylton |
| 2003/0233308 | A1 | 12/2003 | Lundberg et al. |
| 2003/0236737 | A1 | 12/2003 | Kemp et al. |
| 2003/0236795 | A1 | 12/2003 | Kemp et al. |
| 2004/0006534 | A1 | 1/2004 | Fung |
| 2004/0044613 | A1 | 3/2004 | Murakami et al. |
| 2004/0064393 | A1 | 4/2004 | Luenberger |
| 2004/0083158 | A1 | 4/2004 | Addison et al. |
| 2004/0083165 | A1 | 4/2004 | Lawrence |
| 2004/0128261 | A1 | 7/2004 | Olavson et al. |
| 2004/0148249 | A1 | 7/2004 | Kinnear |
| 2004/0172355 | A1 | 9/2004 | Pandher |
| 2004/0199452 | A1 | 10/2004 | Johnston et al. |
| 2004/0199455 | A1 | 10/2004 | Saliba |
| 2004/0199459 | A1 | 10/2004 | Johnston et al. |
| 2004/0267655 | A1 | 12/2004 | Davidowitz et al. |
| 2005/0160024 | A1 | 7/2005 | Soderborg et al. |
| 2005/0260492 | A1 | 11/2005 | Tucholski et al. |
| 2006/0160024 | A1 | 7/2006 | Barr et al. |
| 2006/0184447 | A1 | 8/2006 | Nieboer et al. |
| 2006/0253368 | A1 | 11/2006 | O'Callahan et al. |
| 2007/0255642 | A1 | 11/2007 | Keith |
| 2008/0052223 | A1 | 2/2008 | Johnson et al. |
| 2008/0091584 | A1 | 4/2008 | Johnson et al. |
| 2009/0119201 | A1 | 5/2009 | Burns et al. |
| 2009/0265267 | A1 | 10/2009 | Johnston et al. |
| 2010/0094746 | A1 | 4/2010 | MacGregor et al. |
| 2010/0306133 | A1 | 12/2010 | Johnston et al. |
| 2011/0040669 | A1 | 2/2011 | Lee et al. |
| 2011/0270737 | A1 | 11/2011 | Johnston et al. |
| 2012/0030090 | A1 | 2/2012 | Johnston et al. |
| 2012/0041896 | A1 | 2/2012 | Johnston et al. |

FOREIGN PATENT DOCUMENTS

| | | |
|---|---|---|
| EP | 1178416 A1 | 2/2002 |
| JP | 2003505794 A | 2/2003 |
| WO | 9737735 A1 | 10/1997 |
| WO | 02089027 A2 | 11/2002 |

(56) References Cited

FOREIGN PATENT DOCUMENTS

| | | |
|---|---|---|
| WO | 02091650 A2 | 11/2002 |
| WO | 03001325 A2 | 1/2003 |
| WO | 03034297 A1 | 4/2003 |
| WO | 2004/008274 A2 | 1/2004 |
| WO | 2004081737 A2 | 9/2004 |

OTHER PUBLICATIONS

Barone-Asesi, G. and Whaley R., "Efficient Analytic Approximation of American Option Values", Journal of Finance, vol. 42, No. 2 (Jun. 1987) pp. 301-320.
Dec. 28, 2012—(PCT) International Search Report and Written Opinion—U.S. Appl. No. 12/618,40.
Downes, et al., Dictionary of Finance and Investment Terms, Barrons Educational Services, 1998, pp. 27-28.
(Ross) Derek, "Controlling Derivatives", Accountancy, London: Mar. 1995, vol. 115, Issue 1219, p. 138.
Zeto, "Pricing and Hedging American Fixed-Income Derivatives with Implied Volatility Structures in Two-Factor Health—Marrow-Morton Model", The Journal of Future Markets. Hoboken. Sep. 2002, vol. 22, Issue 9, p. 839.
Aggarwal, "Defining Parameters of an Underling Variable (Asset/Value) and Establish Water Table as Underlying Value", Finance India. Delhi: Dec. 2002, vol. 16, Issue 4, p. 1273.
Ritchie, Abstract, "Why Market Maker Position Limits Should be Delta-Based", Futures, vol. 17, No. 9, p. 42(2), Aug. 1988; UMI Publication No. 00415047.
Meyer, "Calculation and Comparison of Delta-Neutral and Multiple-Greek Dynamic Hedge Returns Including of Market Frictions", Department of Commerce, International Review of Economics and Finance; 12 (2003), pp. 207-235.
Temple, et al., World Reporter™; Investors Chronicle; Dec. 11, 1998, Copyright ® 1998 Investors Chronicle, p. 62.
Holter, "It's Liquidity Stupid", CBOE Ups S&P Limits; www.futuresmag.com; Nov. 1996.
Kawaller, "A Novel Approach to Transactions-Based Currency Exposure Management", Financial Analysis Journal, Nov./Dec. 1992; 48, 6; p. 79.
"S&P ComStock/Micro Hedge Windows: Results Rooted in Reliability", Futures (Cedar Falls, Iowa); Annual 1993, vol. 22, No. 7, p. 26(1); Copyright Oster Communications Inc. 1993.
Carandang, "Derivative Portfolio Risk Management Using a Value-at-Risk Framework", Proceedings of the IEEE/IAFE 1997, Computational Intelligence for Financial Engineering (CIFEr) (Cat. No. 97TH8304), Inclusive Page Nos. 260-5, New York, NY 1997.
Jun. 30, 2005—(PCT) International Search Report and Written Opinion—PCT/US04/07064.
Sep. 2, 2008—(EP) Examination Report—App No. 04718565.7.
Jul. 21, 2009—(JP) Office Action—App. JP2006-506956.
Document attached to Notice of Allowance dated Mar. 19, 2009, from file history of U.S. Appl. No. 10/611,458.
ITG Platform Brochure, 6 pages, published on or before Feb. 16, 1999.
ITG POSIT Brochure, 4 pages, published on or before Feb. 16, 1999.
Document titled "The Peg Orders", downloaded from <http://www/euronext.com/>, first published before Nov. 3, 2011.
Sep. 30, 2013—(CA) Examiner's Report—App 2,518,623.
Feb. 16, 2012—(CA) Office Action—App. 2,518,623.
Apr. 20, 2012—(US) Final Office Action—U.S. Appl. No. 13/182,178.
Jan. 28, 2015—(CA)—Office Action—App. 2,518,623.
Oct. 12, 2016 (CA)—Office Action—App. 2,518,623.
Oct. 28, 2015 (CA)—Office Action—App. 2,518,623.
"Great Expections", Howard Banks, Forbes, Dec. 2, 1996, 3 pages.
David G. McMillan, Alan E. H Speight, "Nonlinear dynamics in high-frequency intraday financial data: Evidence for the UK long gilt futures market," The Journal of Futures Markets, Hoboken: Nov. 2002, vol. 22, Iss. 11, p. 1037.
Feb. 16, 2012 (CA)—Office Action—App. No. 2,518,623.
"Single Integrated Architecture" [retrieved on Dec. 5, 2003] Retrieved from the internet, <URL:http://www.sungard.com/products and services/stars/panorama/solutions/panoramatechnologyandinfrastr>.
Senior, Adriana: "Morgan Buying Into Network for On-Line Security Trades" [retrieved on Mar. 25, 2005] Retrieved from the internet <URL:http://proquest.uni.com/pqdlink?index=26&sid=1&srchmode=3&vinst=PROD&frnt=3&st>.
Ostrovsky, Arkady, "Working Towards a Seamless Link: Global Protocol" [retrieved on Mar. 25, 2005] Retrieved from the internet <URL:http://proquest.uni.com/padlink?index=l&sid=1&srchmode=1&vinst=PROD&frnt=3&st>.
"Case Study: BSE implements intelligent switching architecture Combining networks intelligently" [retrieved on Dec. 5, 2003] Retrieved from the internet <URL: http://www.networkmagazineindia.com/200302/case02.shtml>.
"BSE The Stock Exchange, Mumbal Network Diagram" [retrieved on Dec. 5, 2003] Retrieved from the Internet <URL: http:/>.
Domowitz, Ian, "Electronic Deirvatives Exchanges: Implicit Mergers, Network Externalities, and Standardization" The Quarterly Review of Economics and Finance, vol. 35, No. 2, Summer, 1995, p. 163-175.
"Derivatives Drive New Network" Barron's, Nov. 4, 1991: 71, 44: ABLINFORM Global, p. 36.
NYFIX, Inc. Routes OTC Orders to American Stock Exchange [retrieved on Dec. 5, 2003] Retrieved from the internet <URL:http://www.prnewswire.com/cgi-bin/stories.pl?ACCT=SVBIZINK3.story&STORY=/www/story/11-24-2.>.
"Trading and Decision Support" [retrieved on Dec. 5, 2003] Retrieved from the internet <URL :http://www.sungard.com/products_and_services/stars/panoram/solutions/panoramatrading.htm>.
"Orc Technology" [retrieved on Dec. 5, 2003]. Retrieved from the internet <URL :http://www.orcsoftware.com/Technology/index.htm>.
"Creditex Widens Access"[retrieved on Mar. 29, 2004] Retrieved from the internet <URL:http://www.efinancialnews.com/index.cfm?...on=print_view&passedref=8000000000002212>.
Treanor, Jill, "Banks plan trading network for $52 trillion derivatives" [retrieved on Mar. 18, 2004] Retrieved from the internet <URL :http://www.guardian.co.uk/business/story/0,3604,178019,00.html>.
"OnExchange Selects Exodus to Host Online Derivatives Exchange; Leading Online Derivatives Exchange Optimizes Network Performance by Selecting Leader in Complex Internet Hosting" [retrieved on Mar. 25, 2004] Retrieved from the internet <URL :http://www.findarticles.com/cf_0/m0EIN/2000_Nov_7/66657629/pl/article.jhtml>.
"ExNet Network"[retrieved on Dec. 5, 2003] Retrieved from the internet <URL:http://www.orcsoftware.com/Products/ExNetPIPNetwork.htm>.
"Orc Futures"[retrieved on Dec. 5, 2003] Retrieved from the internet <URL:http://www.orcsoftware.com/Products/OrcFutures.htm>.
"Orc Liquidator" [retrieved on Dec. 5, 2003] Retrieved from the internet <URL:http://www.orcsoftware.com/Products/OrcLiquidator.htm>.
"Electronic-Trading Newsflashes", dated Dec. 4, 2003, [retrieved on Dec. 5, 2003] Retrieved from the internet <URL:http://www.wstonline.com/printableArchive/;jsessionid=NA3QPNTTNKCOIQSNDBCCK . . . >.
"Electronic-Trading Newflashes", dated Sep. 11, 2003, [retrieved on Dec. 5, 2003] Retrieved from the internet , URL:http://www.wstonline.com/printableArticle/;jsessionid=ILJHDTNYRJNVMQSNDBCCKHY?doc id=14 . . . >.
"Press Releases", Leading Derivative Dealers Announce SwapsWire—A Pioneering Interest Rate Derivatives Electronic Dealing Network dated Apr. 10, 2000, [retrieved on Mar. 18, 2004] Retrieved from the internet <URL:http:www.swapswire.com/press/10_04_00.asp>.
"The integrated, real-time solution for bank treasure and portfolio management" SunGard Securities Processing, © 2003 SunGard Financial Systems.

(56) References Cited

OTHER PUBLICATIONS

"Panorama EQN" [retrieved on Dec. 5, 2003] Retrieved from the internet <URL:http:www.sungard.com/products_and_services/stars/panorama/solutions/panoramatcdistribution.htmr>.

"Chicago Board of Trade certifies Orc Software for its electronic trading platform" [retrieved on Dec. 5, 2003] Retrieved from the internet <URL:http://www.orcsoftware.com/Company/PNR/PNR 031106 e-shot eng.htm>.

"X_Trader Platform" [retrieved on Mar. 18, 2004] Retrieved from the internet URL<http::www.tradingttechnologies.com/blue xtrader.html>.

"X_Trader TT Net" [retrieved on Dec. 5, 2003] Retrieved from the internet URL <http://www.tradingttechnolgoies.com/blue_net.html>.

Introduction to the International Securities Exchange, International Securities Exchange, pp. 1-49, © Internaitonal Securities Exchange 1999.

Kucemba, Stanley, "Active and Passive Foreign Exchange Risk Management: A Primer," TMA Journal; Nov./Dec. 1996; 6; AB/INFORM global, p. 18-22 and 24.

Miller, Merton, "Financial Innovations and Market Volatility", Chapter 11, 1991.

Wohl, Avi, "Implications of an Index-Contingent Trading Mechanism", Journal of Business, vol. 70, No. 4, © The University of CHicago1997, 18 pages.

"Record Volume on ITG Trading Desk", ITG Connect, Spring 1996, © 1996 by Investment Technology Group.

Schellhorn, Henry, "Combination Trading with Limit Orders", Journal of Applied Mathematics & Decision Sciences, pp. 133-150, 1997.

"Securities and Exchange Commission Notice", Federal Register, vol. 59, No. 24, Feb. 4, 1994.

Downes, John, "Dictionary of Finance and Investment Terms", 1985.

POSIT Volume History, http://www.itginc.com/itg_posit_vol_hist.html, ITG POSIT Keeps growing, Aug. 20, 1998, © 1995-1997, 3 pages.

ITG Products, http://www.itginc.com/products.html, Aug. 19, 1998, 1 page.

ITG POSIT, http://www.itginc.com/products/pos_works.html, Aug. 20, 1998, 1 page.

ITG POSIT, http://www.itginc.com/products/pos_advan.html, Aug. 20, 1998, 2 pages.

ITGI's 1995 Third Quarter Results, ITG Press Release Oct. 9, 1995, http://www.itginc.com/itg_press_rel1.html, Aug. 20, 1998, 2 pages.

ITGI's 1995 Fourth Quarter Results: Record Earnings, ITG Press Release Jan. 23, 1996, http://www.itginc.com/4qpress.html, Aug. 20, 1998, 3 pages.

ITG Press Release—Dec. 9, 1996, http://www.itgin.com/presindi.html, Aug. 19, 1998, 2 pages.

ITG POSIT, The Worlds largest Intra-day trade matching system, http://www.itginc.com/products/posit.html, Aug. 19, 1998, 2 pages.

The Future of Trading, ITG QuantEx Brochure, 7 pages.

Robert A. Schwartz, "Reshaping the Equity Markets, A Guide for the 1990's," Harper Business, 1991, 7 pages.

Oct. 15, 1993—"The Chicago Basket" (CXM Basket), Letter, 21 pages.

"Trading on the Frontier", Plan Sponsor, Oct. 1996, 8 pages.

Bleakly, Fred, "Firms Approach Hedges with Caution", Asian Wall Street Journal, New York, NY, Aug. 18, 1993, p. 1.

Lee, Peter, "Industry Standard Sought for Valuing Options", Euromoney, London, May 1993, p. 48, 2 pages.

Chacko, George and Das, Sanjiv, "Pricing Interest Rate Derivatives," The Review of Financial Studies, Mar. 2002, 15, 1, ABI/INFORM Global p. 195.

Variable Defined Derivative Product Order 500

502 — Account number: _____

504 — Underlying Contract: _____

506 — Expiration Month: _____

508 — Put or Call: _____

510 — Buy or Sell: _____

512 — Quantity: _____

514 — Strike Price: _____

516 — Delta: _____

518 — Gamma: _____

520 — Vega: _____

522 — Hedge Order: _____

524 — ○ Contingent

526 — ○ Best Efforts

528 — Formula

530 — ○ Standard ChgUnderlyingPrice*delta+(1/2(ChgUnderlying*gamma)^2)

532 — ○ Custom

534 — Formula: _____

536 — Variables: _____

Figure 5

ORDER RISK MANAGEMENT FOR DERIVATIVE PRODUCTS

The present application is a continuation patent application of U.S. patent application Ser. No. 14/153,801, filed Jan. 13, 2014, which is a continuation patent application of U.S. patent application Ser. No. 13/660,486, filed Oct. 25, 2012, which is a continuation patent application of U.S. patent application Ser. No. 13/182,178, filed Jul. 13, 2011, which is a continuation patent application of U.S. patent application Ser. No. 11/951,891, filed Dec. 6, 2007, which is a divisional of U.S. patent application Ser. No. 10/676,318, filed Oct. 1, 2003, which is a continuation-in-part of U.S. patent application Ser. No. 10/611,458, filed Jul. 1, 2003, which is a continuation-in-part of U.S. patent application Ser. No. 10/385,152, filed Mar. 10, 2003. The entire disclosures of all priority applications are hereby incorporated by reference.

FIELD OF THE INVENTION

The present invention relates to derivative product trading methods and systems and, in particular, to methods and systems that utilize order risk data.

DESCRIPTION OF THE RELATED ART

Computer systems and networks increasingly are being used to trade securities and derivative products. Computer systems and networks provide several advantages when compared to manual methods of trading. Such advantages include increased accuracy, reduced labor costs and the ability to quickly disseminate market information.

Options are frequently traded via computer systems. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders typically use theoretical models to determine the prices at which they will offer to buy and sell options. The theoretical option pricing models often produce values that reflect an option's sensitivity to changes in predefined variables. These predefined variables are assigned Greek letters, such as delta, gamma, theta, and vega. Delta is a measure of the rate of change in an option's theoretical value for a one-unit change in the price of the option's underlying contract. Thus, delta is the theoretical amount by which the option price can be expected to change for a change in the price of the underlying contract. As such, delta provides a local measure of the equivalent position risk of an option position with respect to a position in the underlying contract. A "50 Delta" option should change its price 50/100, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary risk management measures used by those who trade in options.

A single option order typically identifies the underlying security, the expiration date, whether the option is a call or a put, the strike price and all other standard order terms (e.g. buy/sell, quantity, account number etc.). Each time the price of the underlying contract changes or one of the variables in the trader's theoretical model changes, a trader may cancel all of the relevant orders, recalculate new order prices and transmit new order prices to the exchange.

Computer implemented systems for trading derivative products can increase a market maker's price exposure. In the open outcry marketplace, a market maker makes markets in strikes/spreads in a serial process. As a result, the market maker is never at risk of having more than one of their prices acted upon simultaneously. In contrast, computer implemented systems allow market makers to provide bid/ask spreads for several strikes and spreads simultaneously. The parallel price exposure in the electronic options marketplace can pose a risk to the market maker in that they can quickly accumulate a large risk position before they can cancel/modify their resting orders. This type price exposure is known as in-flight fill risk.

Existing attempts to protect against in-flight fill risks have resulted in reduced market making participation and corresponding detrimental affects on liquidity, trading volume and price discovery.

Therefore, there is a need in the art for improved derivative product trading methods and systems that allow traders to protect against in-flight fill risks.

SUMMARY OF THE INVENTION

The present invention overcomes problems and limitations of the prior art by providing trading methods and systems that utilize order risk data provided by traders. The order risk data includes order risk parameters, such as maximum delta, gamma and/or vega utilization values for derivative product contracts based on the same underlying product. A match system may then limit the trader's in-flight fill risks by tracking the trader's current order risk parameter utilization state and analyzing potential trades to determine how those trades will impact the trader's order risk parameter utilization state. The match system may also limit cumulative risks by canceling orders after an order risk parameter utilization state has been exceeded.

In one embodiment, advantages of aspects of the present invention are provided by a method of processing derivative product orders at an exchange. The method includes receiving derivative product order risk data including at least one threshold value corresponding to at least one order risk parameter. An order for a derivative product is received from a trader. As used herein "trader" includes a customer submitting an order and is not limited to mean a professional trader. The derivative product order and a trader's current order risk utilization state are utilized to calculate utilization data. Next, the derivative product order is processed in a manner determined by the derivative product order risk data and the utilization data.

In another embodiment, advantages of aspects of the present invention are provided by a method of processing derivative product orders at an exchange. The method includes receiving derivative product order risk data including at least one threshold value corresponding to at least one order risk parameter. An order for a derivative product is received from a trader. A trader's current order risk parameter utilization value is then determined. Next, the derivative product order is executed when the trader's current order risk parameter utilization value does not exceed the threshold value.

In yet another embodiment advantages of aspects of the present invention are provided by a method of managing risks associated with derivative product orders placed at a plurality of exchanges. The method includes transmitting to a first exchange first derivative product order risk data including at least one threshold value corresponding to at least one order risk parameter. Second derivative product order risk data including at least one threshold value corresponding to the at least one order risk parameter is transmitted to a second exchange. Next, a trader's current order risk utilization states at the first exchange and at the second exchange are determined. The determination may then be used to transmit to the first or second exchange an offset value to adjust the order risk parameter.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 5 illustrates a variable defined derivative product order in accordance with an embodiment of the invention;

DETAILED DESCRIPTION OF THE INVENTION

Figure 1:
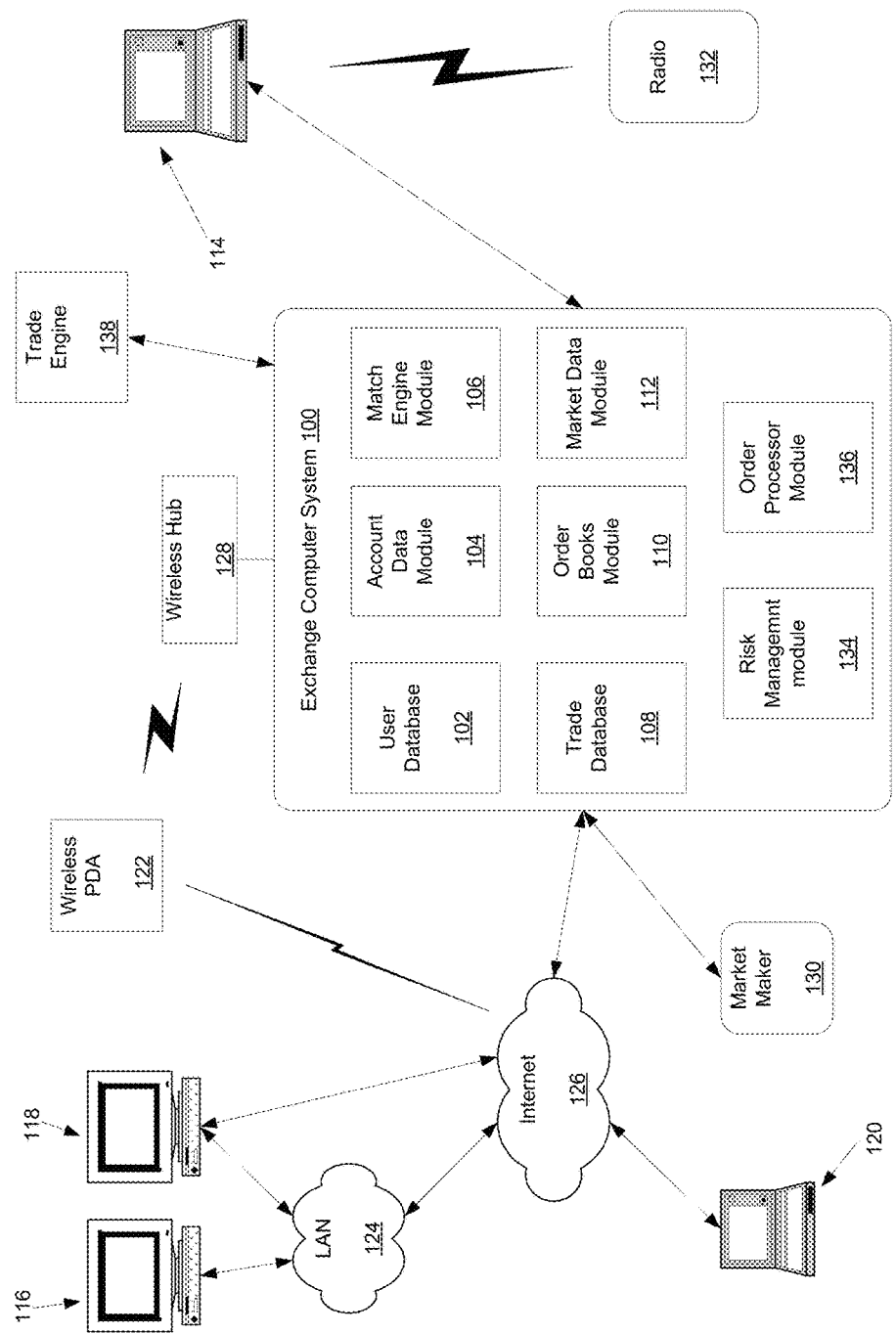
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
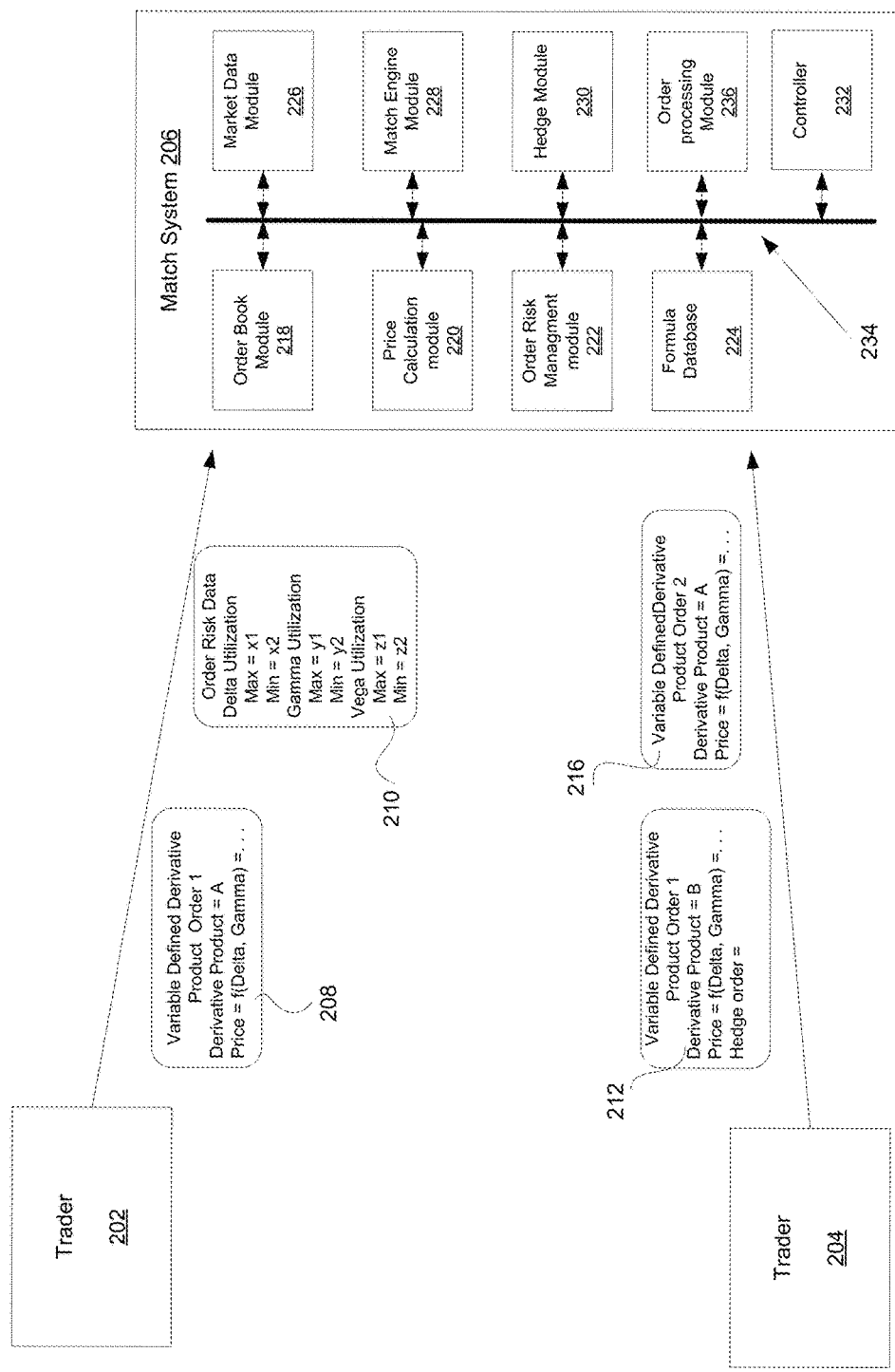
FIG. 2 illustrates a system in which traders exchange information with a match system, in accordance with an embodiment of the invention.

FIG. 2 illustrates a system in which traders 202 and 204 exchange information with a match system 206, in accordance with an embodiment of the invention. Trader 202 is shown transmitting a variable defined derivative product order 208 and order risk data 210 to match system 206. Variable defined derivative product order 208 includes the identification of a derivative product and a variable order price. Variable defined derivative product orders are described in greater detail below in connection with FIG. 3. Order risk data 210 may act as a throttle to limit the number of transactions entered into by trader 202. Order risk data may include maximum and minimum values of delta, gamma and vega to utilize over a given period of time, such as a trading day. Trader 204 transmits derivative product orders 212 and 216 to match system 206. Each trader may transmit several derivative product orders and may associate order risk data with one or more of the derivative product orders. As shown in order 212, one or more of the orders may include the identification of a hedge transaction.

Match system 206 may include several modules for determining prices, matching orders and executing transactions. An order book module 218 may be included to maintain a listing of current bid and offer prices. A price calculation module 220 calculates order prices based on price determination variables provided as part of variable defined derivative product orders. Price calculation module 220 may also calculate order prices based on formulas received from traders. For example, derivative product order 208 may include a formula that is a function of an underlying contract, delta and gamma. Price calculation module 220 may be configured to calculate an order price every time the price of the underlying contract changes.

Price calculation module 220 may use a default formula with price determination variable values supplied by a trader. In one embodiment, the change in a derivative product price is equal to a second order Taylor series expansion, such as:

$$ChgUnderlyingPrice*delta+ (\tfrac{1}{2}(ChgUnderlyingPrice^2*gamma)) \quad (1)$$

wherein ChgUnderlyingPrice is the change in the underlying price. A trader would supply price determination variables delta and gamma and price calculation module would track the derivative product price as the underlying contract changes.

A formula database 224 may be included to store derivative product order formulas. The formulas may be provided by traders or may be standard formulas provided by an exchange. A market data module 226 may be used to collect and disseminate market data. A match engine module 228 matches bid and offer prices. Match engine module 228 may be implemented with software that executes one or more algorithms for matching bids and offers.

A hedge module 230 may be included to perform hedge transactions based on derivative product transactions. In one embodiment of the invention, hedge module 230 conducts transactions with a trading engine or match system other than match system 206. Hedge module 230 may also perform some or all of the function of risk management module 134 (shown in FIG. 1). Exemplary hedge transactions are described in detail below with references to FIGS. 6 and 7.

An order processing module 236 may be included to decompose variable defined derivative product and bulk order types for processing by order book module 218 and match engine module 228. A controller 232 may be included to control the overall operation of the components shown coupled to bus 234. Controller 232 may be implemented with a central processing unit.

An order risk management module 222 is included to limit as in-flight fill risks. For example, trader 202 provided maximum and minimum delta, gamma and vega utilization values to match system 206. Those values may be stored in order risk management module 222 and tracked and computed before executing transactions.

Figure 3:
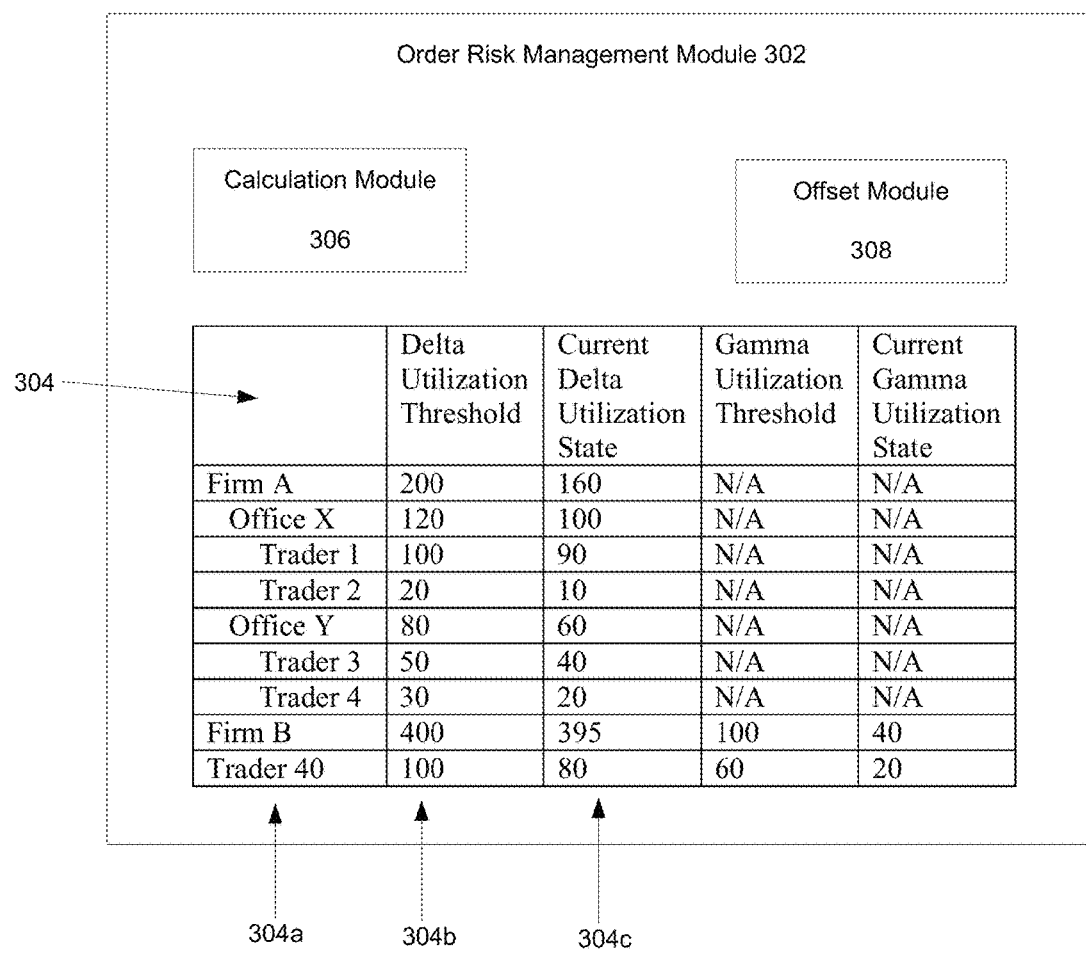
FIG. 3 illustrates an order risk management module in accordance with an embodiment of the invention.

FIG. 3 illustrates an order risk management module 302 in accordance with an embodiment of the invention. A database 304 stores order risk parameter settings. Column 304b, for example, includes delta utilization threshold values. Delta utilization threshold values may be included in order risk data 210 that is transmitted from trader 202 to match system 206. Database 304 may also include the current state of order risk parameters. Column 304c, for example, includes the current delta utilization state for the entities listed in column 304a. The current utilization state of an order risk parameter is calculated by adding together the utilization values of the order risk parameter from previous trades. For example, if a trader is involved in two trades having individual delta utilization values of +45 and +60, after the second trade is executed, the trader's delta utilization state would be equal to +105.

Database 304 shows an embodiment in which several levels of order risk parameters may be used. For example, firm A has offices X and Y and employs traders 1-4. Trader 1 is obligated to comply with the order risk parameters for himself, office X and firm A. Providing order risk parameter settings in a hierarchal manner allows entities to allocate risks among subordinate entities.

Order risk management module 302 may also include a calculation module 306 for calculate order risk parameter values. An offset module 308 may be used to process offset values received from traders. An offset value may be used to provide an adjustment to an order risk parameter threshold value. For example, firm A can increase its delta utilization threshold to 220 by providing an offset value of 20. In one embodiment of the invention, an entity may allow subordinate entities to provide offset values and place limits on the use of offsets. Match system 206 may also be configured to regulate the use of offsets.

Figure 4:
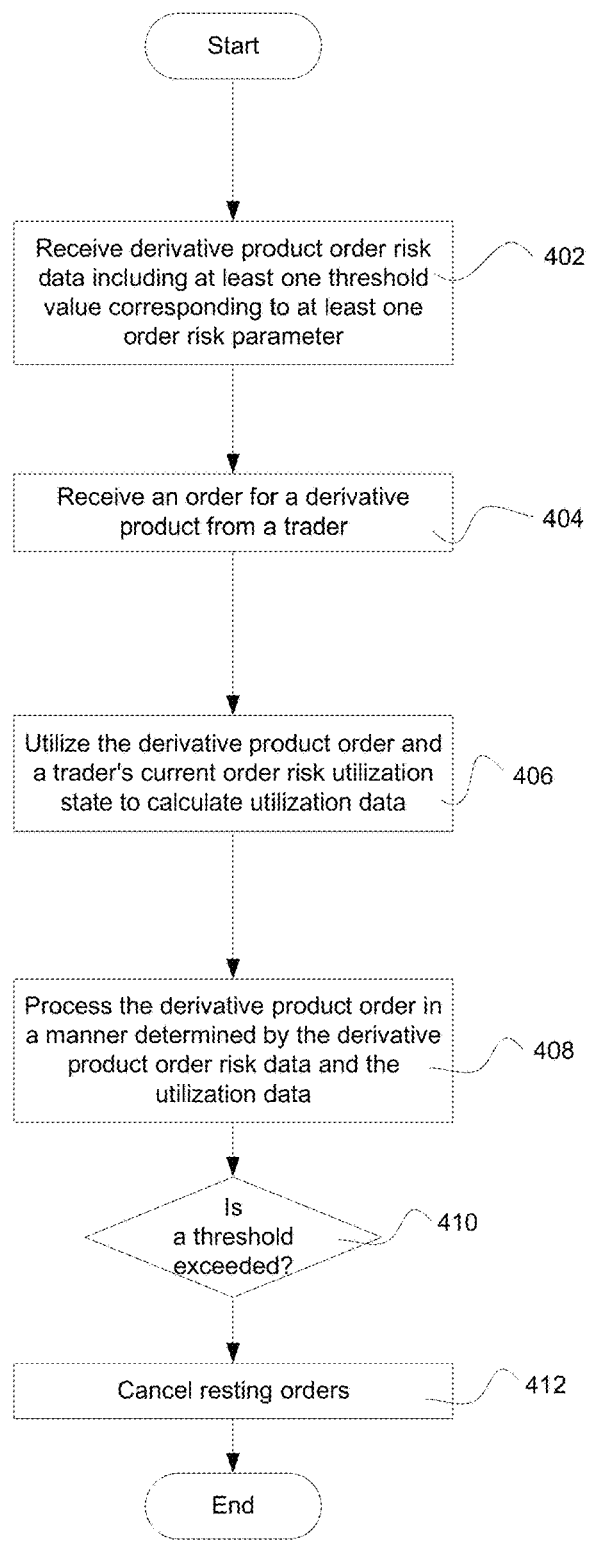
FIG. 4 illustrates a method of processing derivative product orders at an exchange, in accordance with an embodiment of the invention.

FIG. 4 illustrates a method of processing derivative product orders at an exchange, in accordance with an embodiment of the invention. In step 402 a matching system receives derivative product order risk data including at least one threshold value corresponding to lease one order risk parameter. Step 402 may include receiving order risk data 210. Next, the match system receives an order for a derivative product from a trader in step 404. Step 404 may include receiving a variable defined derivative product order, as has been described above. In step 406, the match system utilizes the derivative product order and a trader's current order risk utilization state to calculate utilization data. In some embodiments of the invention, step 406 may include applying the utilization of a hedge transaction that accompanies a derivative product order so that the utilization data accounts for the hedge transaction. Of course, when the trader is a subordinate entity, step 406 may include utilizing the current order risk utilization state of one or more additional entities. For example, with respect to FIG. 3, when analyzing trader 1's current utilization state, the utilization states of office X and firm A should also be analyzed. This is because trader 1 may be below his utilization threshold, but office X or firm A may be over the relevant utilization threshold.

In step 408 the derivative product order is processed in a manner determined by the derivative product order risk data and the utilization data. If the execution of the trade would not cause the resulting utilization data to exceed the relevant utilization threshold, the trade is executed. There are several alternatives for treating orders that would cause the utilization data to exceed a relevant utilization threshold value. In a first embodiment a portion of the derivative product order is executed. The portion includes the maximum number of contracts that do not cause the utilization data to exceed the threshold value. In an alternative embodiment, a portion of the order that includes the minimum number of contracts that cause the utilization data to exceed the threshold value is executed. For example, if four contracts would not cause the utilization data to exceed the threshold value and five contracts would, five contracts are executed. Of course other embodiments may involve other trading units. For example, if a contract is typically traded in units of 100 contracts, each group of 100 contracts would be treated as a trading unit and treated like the individual contracts discussed above.

In another embodiment of the invention, an entire order is canceled if the order would result in a trader's order risk utilization state exceeding the threshold value after the trade is executed. For example, if the execution of an order for five contracts would cause the threshold value to be exceeded, no contracts are executed. In one more alternative embodiment, a derivative product order is executed as long as a trader's current order risk utilization state (before execution of the order) does not exceed the threshold value.

In step 410 it is determined whether the trader's order risk utilization state exceeds a threshold value. When a threshold has been exceeded, some or all of the trader's resting orders may be cancelled in step 412. In various embodiments all resting orders or all resting orders within an option class are cancelled. Alternatively, all risk increasing orders may be cancelled. For example, if a positive delta limit has been exceeded, then all call bids and put offers are cancelled. If a negative delta limit has been exceeded, then all call offers and put bids are cancelled. If a positive gamma limit has been exceeded, then all call and put bids are cancelled. Likewise, if a negative gamma limit has been exceeded, all call and put offers are cancelled.

Returning to FIG. 2, match system 206 may include modules that perform some or all of the functions of the modules shown in FIG. 1. Moreover, match system 206 may also be coupled to some or all of the elements shown in FIG. 1. Match system 206 may also be configured to transmit warning messages to traders alerting them of order risk utilization states. Match system 206 may also include or be coupled to an interface that allows traders to check current order risk utilization states via the Internet, another network, telephone, etc.

FIG. 5 illustrates a variable defined derivative product order 500 in accordance with an embodiment of the invention. Variable defined derivative product order 500 may include a field 502 for identifying a trader's account number. The underlying contract may be identified in field 504. The expiration month of the derivative product order may be identified in field 506. The order may be identified as a put or a call in field 508 and whether the order is a buy or sell in field 510. The quantity may be identified in field 512 and the strike price may be identified in field 514. Delta, gamma, and vega values may be identified in fields 516, 518 and 520 respectively. Of course, other price determination variables may also be identified as part of a standard variable defined derivative product order.

A hedge transaction may be identified in field 522. The user may choose to make the derivative product order contingent on the existence of an available hedge transaction by selecting radio button 524. The user may also choose to use best efforts to fill the hedge order after the execution of the derivative product order by selecting radio button 526.

The formula for calculating the price of variable defined derivative product order is identified in field 528. The trader can select a standard formula 530 to compute their derivative product price or select a custom formula 532. In one embodiment, a standard formula is supplied by or sponsored by an exchange. When a custom formula is selected, the trader may also provide a formula in field 534 and the variables in field 536. In one implementation of the invention, variable defined derivative product order 500 is created in the form of an XML for HTML document created by one of the computer devices shown in FIG. 1. Variable defined derivative product order 500 may be encrypted before being transmitted to an exchange. Of course, one or more additional or alternative fields may be included. For example, a reference price may be included to protect against mispricing conditions.

Figure 6:
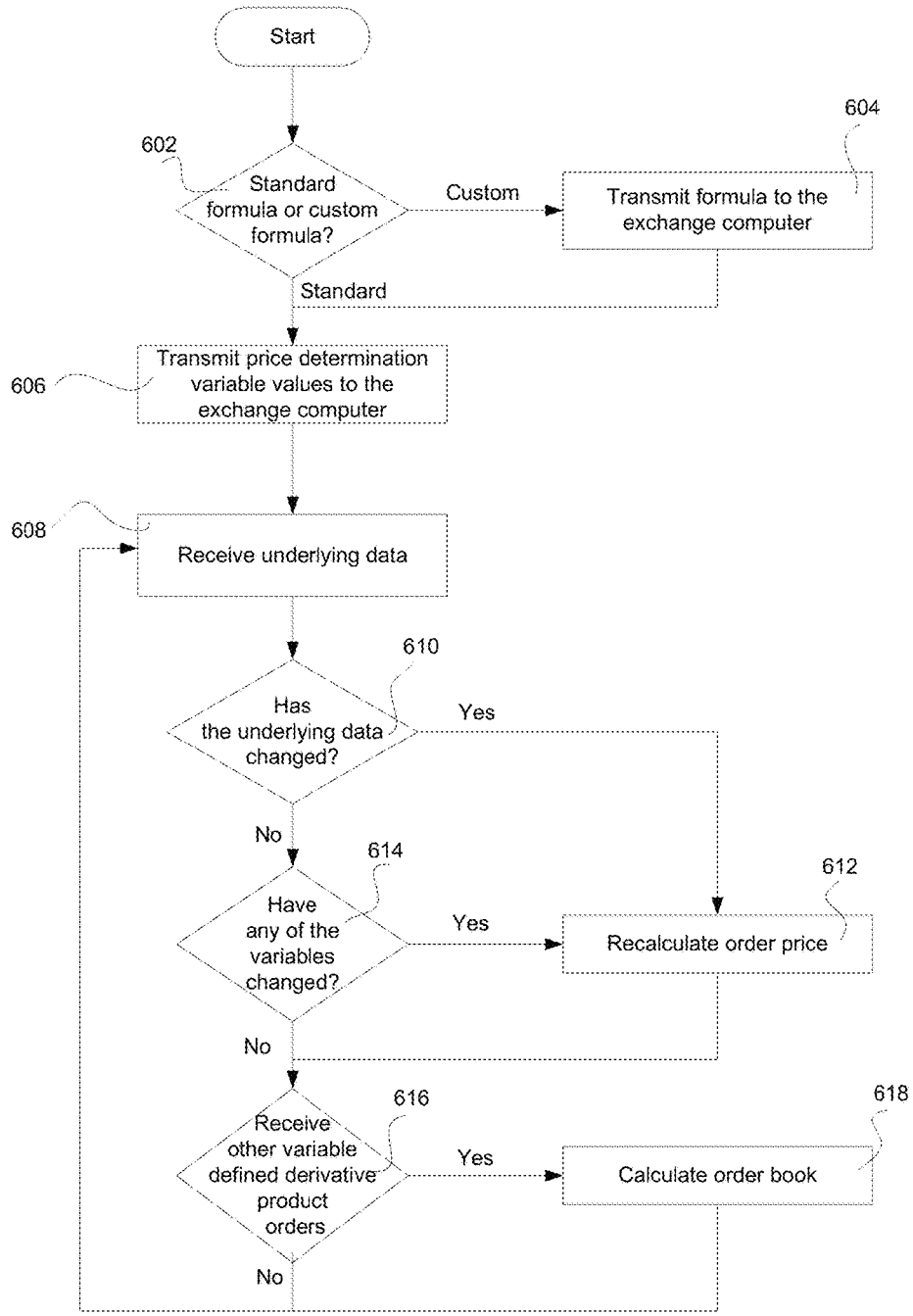
FIG. 6 illustrates a method of processing variable defined derivative product orders by an exchange computer, in accordance with an embodiment of the invention.

FIG. 6 illustrates a computer-implemented method of trading a derivative product contract that involves the use of a variable order price, in accordance with an embodiment of the invention. First, in step 602 it is determined whether the trader desires to use a standard exchange sponsored formula. When the trader uses a custom formula, the formula is transmitted to the exchange computer in step 604. Step 604 may also include the trader or exchange transmitting the formula to other market participants. In step 606, the trader transmits price determination variable values for the standard formula to an exchange computer. For example, step 606 may include transmitting delta and gamma values to an exchange computer. Step 606 may also including transmitting a formula and price determination variables to other computers so that other computers may calculate an order book. Alternatively, the exchange computer may distribute all formulas and price determination variables to user computers. In step 608 the trader receives underlying data. The underlying data may include current bid and offer prices for underlying put and call futures contracts.

In step 610 it is determined whether the underlying data has changed. The price of an underlying contract may change multiple times per second. When the underlying contract data has changed, in step 612 the trader's computer device may recalculate the order price of their variable defined derivative product order and all other variable defined derivative product orders from other users based on current data. In step 614, it is determined whether any of the price determination variables used in the formula to calculate the order price have changed. The price determination variables may include delta, gamma, and vega. When the price determination variables have changed, in step 612, the order price is recalculated. Of course, step 612 may be performed based on changes in current underlying contract data and variables. The order price may be displayed to the trader or plotted on a graph that tracks order prices.

Some of the advantages of aspects of the present invention are that they allow traders to maintain an order book and limit the amount of information that must be disseminated by an exchange computer or match system. In particular, an exchange computer or match system may transmit a plurality of variable defined derivative product orders to several different traders only when other derivative product order users establish their initial positions. Thereafter, the exchange computer may then only transmit underlying data or other data used to calculate variable defined derivative product order prices. Each trader computer may then periodically calculate current order prices based on information received from the exchange computer. For example, in step 616 it is determined whether other variable defined derivative product orders are received. When variable defined derivative product orders are received, in step 618 the trader computer may calculate new order book listings for current bids and offers related to variable defined derivative product based orders. The order book may be displayed to the trader in any one of a variety of conventional formats. After step 618, control returns to step 608.

Figure 7:
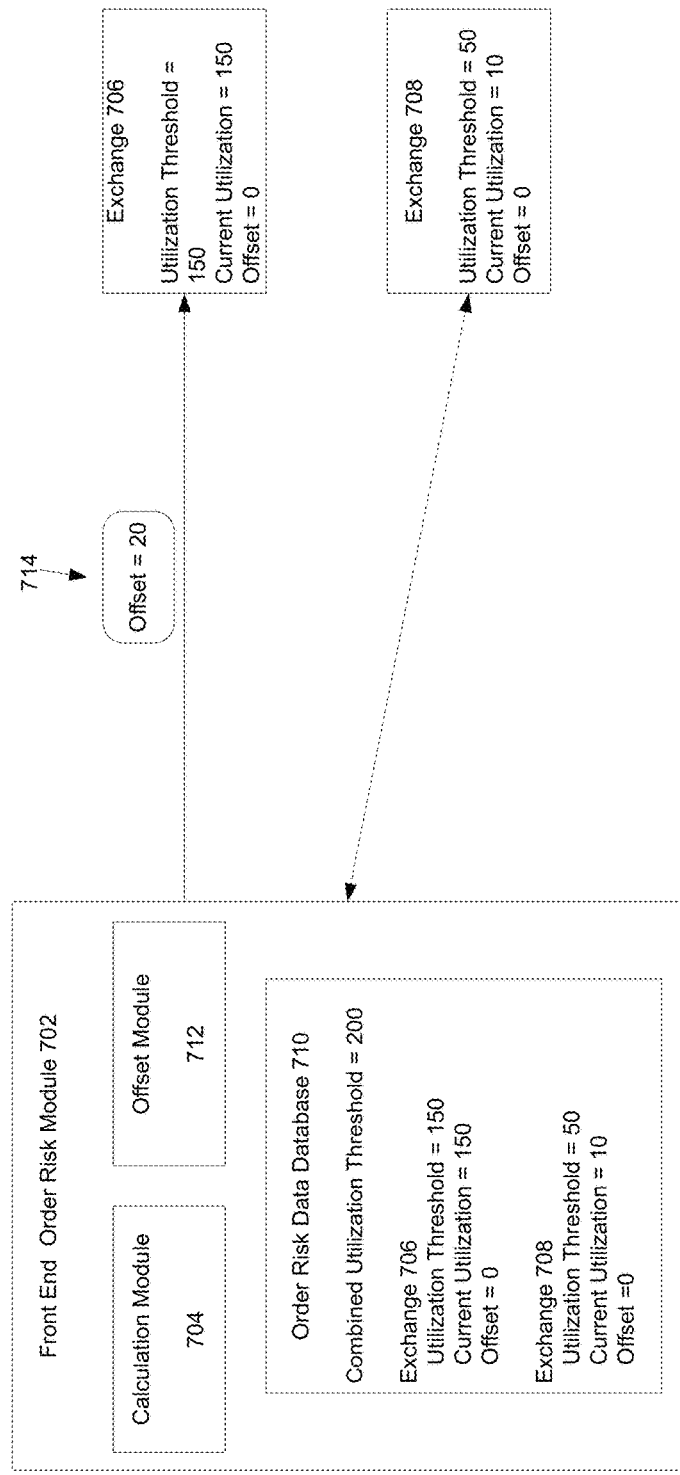
FIG. 7 illustrates a front-end system that may be used to manage risks associated with derivative product orders placed at a plurality of exchanges.

FIG. 7 illustrates a front-end system that may be used to manage risks associated with derivative product orders placed at a plurality of exchanges, in accordance with an embodiment of the invention. A front-end order risk module 702 may reside on a terminal connected to one or more exchanges via a network, such as the Internet. Front-end order risk module 702 may comprise a portion of a software application that allows traders to interact with exchanges. A calculation module 704 functions in a manner similar to calculation module 306. Front-end order risk module 702 allows traders to manage risks associated with resting orders placed at a plurality of exchanges. For example, the trader may provide order risk data to exchanges 706 and 708. An order risk data database 710 may be included to calculate and track order risk data that has been provided to exchange 706 and exchange 708.

An offset module 712 may be used to distribute risks among two or more exchanges. For example, the current utilization of an order risk parameter at exchange 706 is equal to the utilization threshold. As a result, no additional contracts will be executed at exchange 706. However, the current utilization of the order risk parameter at exchange 708 is below the utilization threshold. Based on this information, offset module 712 may transmit offset value 714 to exchange 706 to allow exchange 706 to execute additional contracts. The use of offset 714 allows the trader to continue conducting transactions while ensuring that the combined utilization threshold is not exceeded. In one embodiment of the invention, front-end order risk module 702 prompts the trader to enter offset values. In another embodiment of the invention, offset module 712 includes computer-executable instructions that generate offset values to transmit to exchanges based on the current utilization at the relevant exchanges.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention are not limit to implementations that involve the trading of derivative products. Those skilled in the art will appreciate that aspects of the invention may be used in other markets. Credit market transactions, for example, involve risk parameters in the form of duration risk and default risks. The processing of appropriate orders in credit markets may include analyzing duration risk utilization and default risk utilization.

What is claimed is:

1. A method of protecting against in-flight fills at an exchange, the method comprising:
   (a) receiving, at a processor of an order risk management module, order data including at least one threshold value corresponding to at least one order parameter;
   (b) receiving, at the processor of the order risk management module from a computing device of a trader, an order for a product;
   (c) at the processor of the order risk management module, utilizing the product order and a trader's current order risk utilization state to calculate utilization data, wherein the utilization data is calculated using the product order and the trader's current order risk utilization state; and
   (d) processing the product order at the processor of the order risk management module in a manner that is a function of the product order risk data and the utilization data, wherein the processing comprises determining that the trader's current order risk utilization state exceeds a threshold value, and then cancelling all of the trader's resting orders at the exchange to protect against in-flight fills;
   wherein the variable defined order price of the product is a function of an original order price, an updated price of an underlying product and at least one price determination variable value based on a predetermined formula.

2. The method of claim 1, wherein (d) comprises executing a portion of the product order.

3. The method of claim 2, wherein the portion of the product order includes the maximum number of contracts that do not cause the utilization data to exceed the threshold value.

4. The method of claim 2, wherein the portion of the product order includes the minimum number of contracts that cause the utilization data to exceed the threshold value.

5. The method of claim 2, wherein the portion of the product order includes the maximum number of trading units that do not cause the utilization data to exceed the threshold value.

6. The method of claim 2, wherein the portion of the product order includes the minimum number of trading units that cause the utilization data to exceed the threshold value.

7. The method of claim 2, wherein the at least one order risk parameter comprises delta.

8. The method of claim 2, wherein the product order risk data received in (a) includes at least two threshold values corresponding to at least two order risk parameters.

9. The method of claim 8, wherein the at least two order risk parameters comprise delta and gamma.

10. The method of claim 1, wherein (d) comprises canceling the order if the trader's order risk utilization state after executing the entire order would cause the threshold value to be exceeded.

11. The method of claim 1, wherein the product order risk data received in (a) includes at least three threshold values corresponding to at least three order risk parameters.

12. The method of claim 11, wherein the at least three order risk parameters comprise delta, gamma and vega.

13. The method of claim 1, further including comparing the order risk data to maximum and minimum rules set by the exchange.

14. The method of claim 1, further including receiving from the trader offset data for the product order risk data and (d) comprises processing the product order in a manner that is a function of the at least one threshold value, the utilization data and the offset data.

\* \* \* \* \*